(12) United States Patent
Fan

(10) Patent No.: US 7,684,974 B2  
(45) Date of Patent: Mar. 23, 2010

(54) SYSTEMS FOR DISPLAYING CONVERSIONS OF TEXT EQUIVALENTS

(75) Inventor: David P. Fan, St. Paul, MN (US)

(73) Assignee: InfoTrend, Inc., St. Paul, MN (US)

( * ) Notice: Subject to any disclaimer, the term of this patent is extended or adjusted under 35 U.S.C. 154(b) by 1004 days.

(21) Appl. No.: 11/276,529

(22) Filed: Mar. 3, 2006

(65) Prior Publication Data  
US 2007/0208554 A1 Sep. 6, 2007

Related U.S. Application Data

(60) Provisional application No. 60/658,217, filed on Mar. 3, 2005.

(51) Int. Cl.  
G06F 17/27 (2006.01)

(52) U.S. Cl. .................. 704/9; 701/1; 701/8; 707/4; 707/101

(58) Field of Classification Search .............. 704/9, 704/1, 8, 4, 101  
See application file for complete search history.

(56) References Cited

U.S. PATENT DOCUMENTS

| | | | | |
|---|---|---|---|---|
| 4,930,077 A | * | 5/1990 | Fan | 704/8 |
| 5,963,965 A | * | 10/1999 | Vogel | 715/236 |
| 6,006,233 A | * | 12/1999 | Schultz | 707/101 |
| 7,093,005 B2 | * | 8/2006 | Patterson | 709/220 |
| 7,519,521 B2 | * | 4/2009 | Fan et al. | 703/2 |
| 2002/0194223 A1 | * | 12/2002 | Meyers et al. | 707/513 |
| 2005/0086050 A1 | * | 4/2005 | Meyers et al. | 704/4 |

* cited by examiner

*Primary Examiner*—Qi Han  
(74) *Attorney, Agent, or Firm*—Schwegman Lundberg & Woessner, P.A.

(57) ABSTRACT

Embodiments of the invention include a system for displaying an audit diagram. The system includes a monitor capable of electronically displaying the audit diagram. The monitor includes a text equivalent constructed from an input text, and a conversion representation including an operator indicator, a result arrow, and a rule arrow.

9 Claims, 5 Drawing Sheets

6  DUMPTY  58  NEGATION  2  PUT  22
                   ├─R4:A10>2─┤
                   ▼          ▼
                DELETED    DELETED

*Fig. 7*

6  DUMPTY  0  INSERT  58  NEGATION  2  PUT  22
           ├─R5:A0>0─┤
                     ▼
                    EGG

*Fig. 8*

SYSTEMS FOR DISPLAYING CONVERSIONS OF TEXT EQUIVALENTS

RELATED APPLICATION

The present application claims priority to U.S. Provisional Application 60/658,217, which was filed on Mar. 3, 2005 and which is incorporated herein by reference.

TECHNICAL FIELD

The technical field relates generally to textual analysis.

COPYRIGHT NOTICE

Permission

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawing attached hereto: Copyright © 2005, David P. Fan, All Rights Reserved.

BACKGROUND

Systems are available for analyzing text in which input text is converted to a text equivalent wherein the text equivalent is subsequently converted using one or more specified rules. In past embodiments, the user was presented with the text equivalents before and after a conversion. The present invention facilitates the comprehension of conversions by providing a system for visualizing the conversions.

BRIEF DESCRIPTION OF THE DRAWINGS

FIG. 7 is computer display according to one exemplary embodiment of the present invention.

FIG. 8 is computer display according to one exemplary embodiment of the present invention.

DETAILED DESCRIPTION

Figure 1:
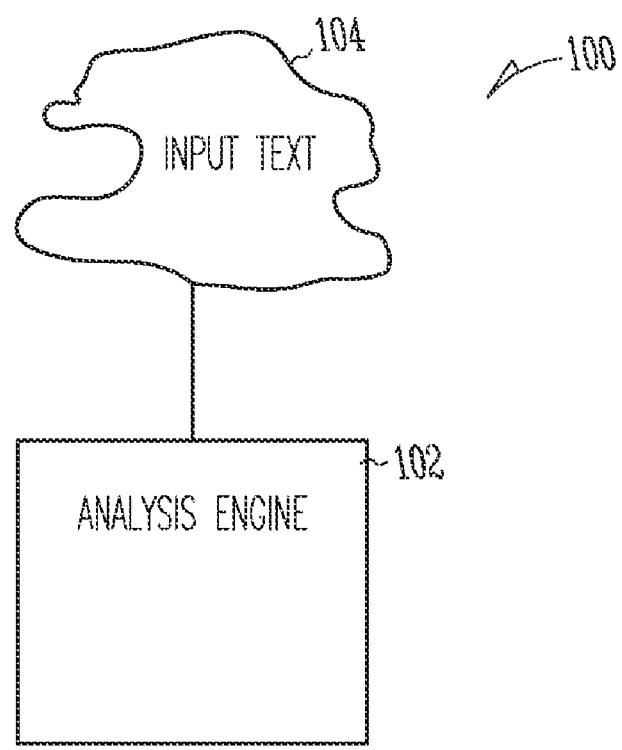
FIG. 1 is a block diagram of a system according to one aspect of the present invention.

In the following detailed description of exemplary embodiments of the invention, reference is made to the accompanying drawings that form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

FIG. 1 is a block diagram of a system according to one aspect of the present invention. A system 100 includes an analysis engine 102. The analysis engine 102 includes software to analyze input text 104.

Figure 2:
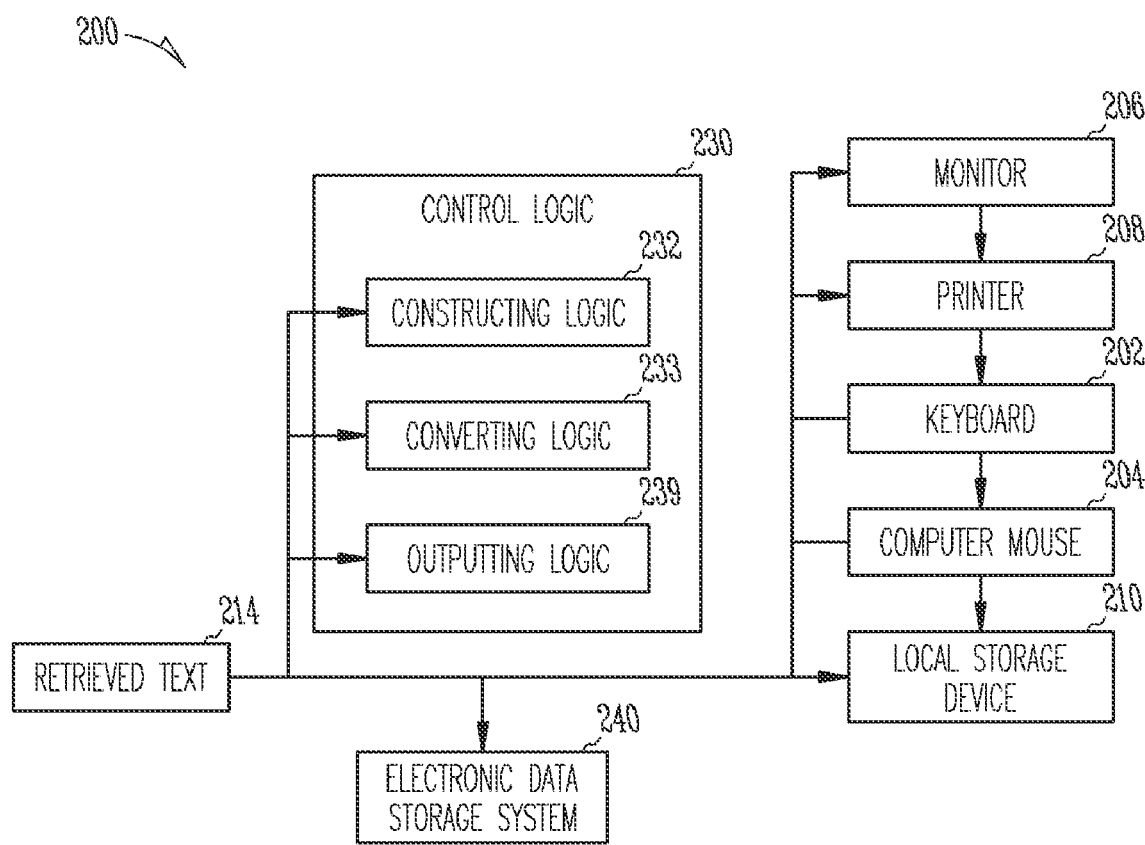
FIG. 2 is a block diagram of a system according to one aspect of the present invention.

FIG. 2 is a block diagram of a system according to one aspect of the present invention. A system 200 according to FIG. 2 is designed to use data in the form of input text 214. The user communicates with the computer through one or more of a keyboard 202, a mouse 204, a monitor 206, a printer 208, and a local storage device 210.

The system 200 includes an electronic storage system 240. In one embodiment, an electronic storage system 240 includes a file storage system 242.

The system 200 includes a controller 230 that includes control logic to control the analysis of text.

In one embodiment, control logic 230 includes one or more of the following logics:

constructing logic 232 controlling the task of converting input text to a text equivalent, converting logic 233 controlling the task of converting a text equivalent, and outputting logic 239 controlling the process of generating output.

Figures 3, 4:
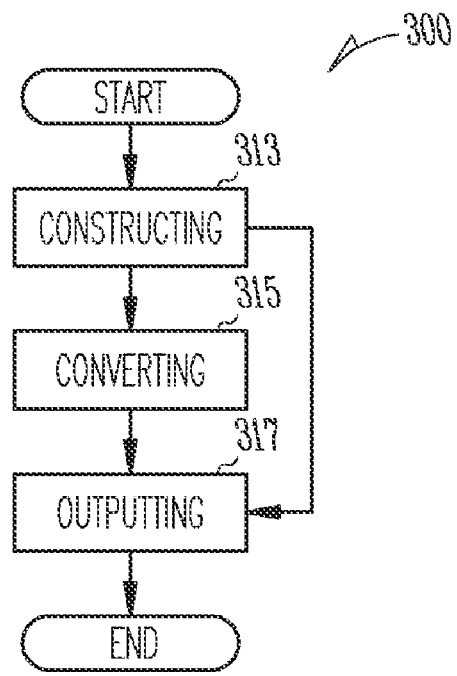
FIG. 3 is a process diagram of a method according to one aspect of the present invention.
FIG. 4 is computer display according to one exemplary embodiment of the present invention.

FIG. 3 illustrates a process diagram of a process embodiment 300 for the analysis of text.

In one embodiment, the process 300 includes constructing 313 for constructing a text equivalent for an input text. In one embodiment, a text equivalent includes an idea. In one embodiment, an idea corresponds to one or more strings of text characters. In one embodiment, an idea results from a conversion of a text equivalent.

In one embodiment, a text equivalent includes an idea distance. In one embodiment, an idea distance is the distance between two idea positions. In one embodiment, an idea position is:

the beginning of a string of text in the input text, the beginning of the input text, or the end of the input text.

In one embodiment, an idea distance includes:

the number of alphanumeric characters between two positions, or the number of words between two positions.

In one embodiment, a text equivalent is an alternating sequence of one or more idea distances and of zero or more ideas.

In one embodiment, the process 300 includes converting 315 for converting a text equivalent. In one embodiment, converting 315 implements one or more conversion rules. In one embodiment, a conversion rule includes one or more rule specifications. In one embodiment, a rule specification includes a rule identifier, and a conversion specification.

In one embodiment, a rule identifier is an identifier number used for referencing the corresponding rule.

In one embodiment, a conversion specification includes the assignment of a role to an idea. In one embodiment, a role includes being:

an operator, or a target.

In one embodiment, a conversion specification includes the assignment of a state to an idea. In one embodiment, a state is:

prior corresponding an idea prior to a conversion process, or resulting corresponding to an idea resulting from a conversion process.

Hereinbelow, the state of an idea is prior in the absence of the qualifier "resulting."

In one embodiment, a conversion specification specifies a conversion process. In one embodiment, a conversion process includes changing the idea structure of a text equivalent. In one embodiment, the changing includes:
  replacing an idea with a resulting idea,
  inserting an idea into a text equivalent, or
  deleting an idea from a text equivalent.

In one embodiment, a conversion process includes changing the idea distance structure of a text equivalent. In one embodiment, the changing includes:
  replacing an idea distance with another idea distance,
  summing the idea distances preceding and following a deleted idea in the text equivalent to give a summed idea distance, or
  deleting an idea distance preceding or following a deleted idea in the text equivalent.

In one embodiment, a conversion specification specifies one or more conversion criteria that must be met before a conversion process. In one embodiment, a conversion criterion is:
  a maximum allowable idea distance, or
  a conversion direction.

In one embodiment, the maximum allowable idea distance is infinite.

In one embodiment, a conversion direction corresponds to a target idea:
  preceding,
  following, or
  either preceding or following an operator idea in a text equivalent sequence.

In one embodiment, the process 300 includes outputting 317 displaying an audit diagram. In one embodiment, an audit diagram includes a representation of a text equivalent constructed from an input text.

In one embodiment, the text equivalent representation includes:
  one or more idea distances, and
  zero or more mnemonics.

In one embodiment, a mnemonic consists of a string of characters including a meaningful reference to an idea. An idea may be referenced by its corresponding mnemonic.

In one embodiment, a mnemonic is a reserved word. In one embodiment a reserved word is:
  "INSERT" indicating that a conversion process includes inserting an idea and an idea distance into a text equivalent, or
  "DELETED" indicating that a conversion process includes deleting an idea from a text equivalent.

In one embodiment, the text equivalent representation includes an alternating sequence of one or more numbers and zero or more mnemonics.

In one embodiment, an audit diagram includes a conversion representation of a conversion process. In one embodiment, the conversion representation includes one or more conversion representation elements. In one embodiment, a conversion representation element is:
  a result arrow indicating a result of a conversion process,
  an operator indicator indicating an operator idea,
  a rule arrow indicating an operator idea and a target idea, or
  a rule label indicating one or more rule specifications.

In one embodiment, an operator indicator is:
  an indicator line with one end adjacent to an operator mnemonic, or
  a result arrow extending from an operator mnemonic.

In one embodiment, a result arrow is:
  a replacement arrow representing the replacement of an idea with a resulting idea,
  an insertion arrow representing the insertion of a resulting idea into a text equivalent, or
  a deletion arrow representing the deletion of an idea from a text equivalent.

In one embodiment, a replacement arrow is referenced by the idea role of the corresponding idea. As an example, an operator replacement arrow refers to replacing an operator idea with a resulting operator idea.

In one embodiment, a result arrow has an arrowhead pointing to a resulting idea mnemonic.

In one embodiment, a rule arrow connects an operator indicator with a result arrow.

In one embodiment, outputting 317 displays a rule label providing information about a conversion rule. In one embodiment, the rule label includes a rule number. In one embodiment, a rule number is preceded by "R".

In one embodiment, the rule label includes a direction indicator indicating a conversion direction. In one embodiment, the direction indicator is:
  "A" if the conversion direction specifies that a target idea should follow an operator idea,
  "B" if the conversion direction specifies that a target idea should precede an operator idea, or
  "E" if the conversion direction specifies that a target idea can either precede or follow an operator idea.

A conversion direction may be referenced by its corresponding direction indicator.

In one embodiment, a rule arrow has an arrowhead pointing to a result arrow. In one embodiment, a rule arrow has an arrowhead pointing to an operator indicator if the conversion direction is E.

In one embodiment, the rule label includes a number indicating a maximum allowable idea distance, the ">" symbol, and a number indicating an idea distance in a text equivalent.

In one embodiment, a rule label is placed on a result arrow. In one embodiment, a rule label is placed on a rule arrow. In one embodiment, a rule label is placed on an operator indicator.

In an exemplary embodiment provided for illustrative purposes, not intended to limit the invention described herein, the system 100 is instantiated by creating an instance called "example 1" with an exemplary input text: "Humpty Dumpty had a great fall. All the King's horses, and all the King's men couldn't put Humpty together again."

Constructing 313 constructs an exemplary text equivalent of the exemplary input text. Constructing 313 uses:
  a specification that the string "Dumpty" corresponds to idea Dumpty,
  a specification that the string "n't" corresponds to idea Negation, and
  a specification that the string "put" corresponds to idea Put.

FIG. 4 illustrates an output 400 including an audit diagram according to an aspect of example 1 produced by outputting 317. The top horizontal row of the audit diagram displays an exemplary text equivalent of the exemplary input text. In the exemplary text equivalent, the numbers in the top row correspond to idea distances wherein:
  6 indicates that idea distance is six alphanumeric characters between the beginning of the exemplary input text and the beginning of the text string "Dumpty" corresponding to idea Dumpty, 58 indicates that there are 58 alphanumeric characters between the beginning of the text string "Dumpty" and the beginning of the text string "n't" corresponding to idea Negation, 2 indicates that there are two alphanumeric characters between the beginning of the text string "n't" and the beginning of the text string "put" corresponding to idea Put, and 22 indicates that there are 22 alphanumeric characters between the beginning of the text string "put" and the end of the exemplary input text.

Output 317 includes a display of a conversion representation for a conversion process using conversion rule 1. The conversion criteria of rule 1 included the conditions that:

an operator idea Negation should be followed by a target idea Put, and that the idea distance between the two ideas should be less than 10.

The exemplary text equivalent has an operator idea and a target idea meeting the conversion criteria of rule 1 thereby allowing the conversion processes specified by rule 1. The conversion representation representing the conversion process according to rule 1 includes:

an operator indicator in the form of a vertical result arrow extending from mnemonic Negation to mnemonic Destroy to indicate that an operator idea Negation is replaced by a resulting operator idea Destroy, a vertical target result arrow extending from mnemonic Put to mnemonic Destroy to indicate that a target idea Put is replaced by a resulting target idea Destroy, a horizontal rule arrow extending from the operator result arrow to the target result arrow to indicate that the prior operator idea is idea Negation and that the prior target idea is idea Put, and a rule label placed on the rule arrow to indicate conversion criteria of rule 1.

The rule label is "R1: A10>2" wherein:

the characters "R1" indicate rule 1, the character "A" indicates the conversion direction, and the characters "10>2" indicate that the maximum allowable idea distance between an operator and a target idea is 10 and that the maximum allowable idea distance is greater than the idea distance of 2 between operator idea Negation and target idea Put in the exemplary text equivalent.

The rule arrow has an arrowhead pointing to the target result arrow corresponding to conversion direction A.

Figure 5:
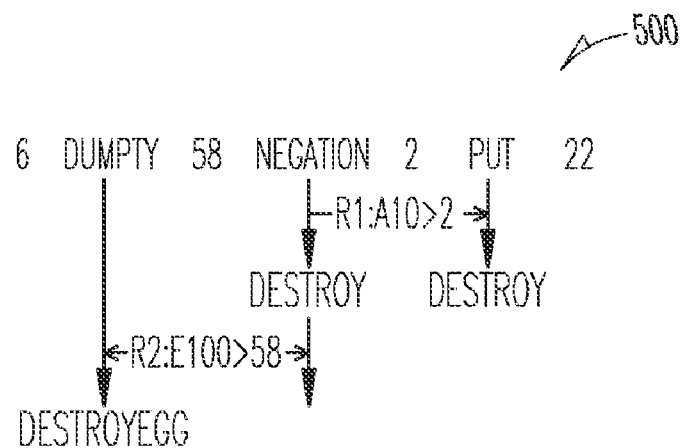
FIG. 5 is computer display according to one exemplary embodiment of the present invention.

FIG. 5 illustrates an output 500 of an aspect of example 1 produced by outputting 317. The top portion of output 500 includes the entire audit diagram of output 400 including the conversion representation resulting from the use of rule 1. Output 500 includes a conversion representation of a conversion process using rule 2 following the use of rule 1 wherein the conversion representation includes:

an operator indicator in the form of a vertical indicator line extending from the mnemonic of an operator idea Destroy, a vertical target result arrow extending from mnemonic Dumpty to mnemonic DestroyEgg to indicate that a target idea Dumpty is replaced by a resulting target idea DestroyEgg, a horizontal rule arrow extending from the operator indicator to the target result arrow to indicate that the operator idea is idea Destroy and that the target idea is idea Dumpty, and a rule label placed on the rule arrow to indicate the conversion criteria of rule 2.

The rule label is "R2: E100>58" wherein:

the characters "R2:" indicate rule 2, the character "E" indicates the conversion direction, and the characters "100>58" indicate that the maximum allowable idea distance between an operator and a target idea is 100 and that the maximum allowable idea distance is greater than the idea distance of 58 between operator idea Destroy and target idea Dumpty in the exemplary text equivalent.

The rule arrow has arrowheads pointing both to the operator indicator and to the target result arrow to indicate that rule 2 permits a target idea Dumpty to precede or to follow an operator idea Destroy.

Figure 6:
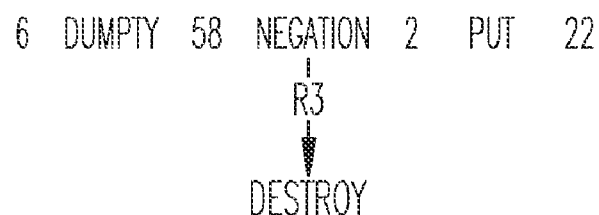
FIG. 6 is computer display according to one exemplary embodiment of the present invention.

FIG. 6 illustrates an output 600 of an audit diagram corresponding to an aspect of example 1 produced by outputting 317. The top horizontal row of the audit diagram includes a display of the same exemplary text equivalent as in output 400. The audit diagram includes a conversion representation of a conversion process resulting from the use of rule 3 wherein the conversion representation includes:

a vertical target result arrow extending from mnemonic Negation to mnemonic "DELETED" to indicate that a target idea Negation is deleted from the exemplary text equivalent, and a rule label placed on the target result arrow to indicate the conversion criteria of rule 3.

The rule label is "R3" wherein the characters "R3" indicate rule 3. The absence of other characters on the rule label indicates that there are no specific conditions so any idea Negation is deleted from the exemplary text equivalent. A conversion specification of rule 3 is that the idea distance between idea Dumpty and idea Put is the summed distance of 60 corresponding to the sum of idea distance 58 preceding deleted idea Negation and idea distance 2 following deleted idea Negation. The summation is represented in the audit diagram by retaining the numbers 58 and 2 in the exemplary text equivalent.

FIG. 7 illustrates an output 700 of an audit diagram corresponding to an aspect of example 1 produced by outputting 317. The top horizontal row of the audit diagram includes a display of the same exemplary text equivalent as in output 400. The audit diagram includes a conversion representation of a conversion process resulting from the use of rule 4 wherein the conversion representation includes:

an operator indicator in the form of a vertical operator result arrow extending from mnemonic Negation to mnemonic "DELETED" to indicate that an operator idea Negation is deleted, a vertical target result arrow extending from mnemonic Put to mnemonic "DELETED" to indicate that a target idea Put is deleted, a horizontal rule arrow extending from the operator result arrow to the target result arrow to indicate that the operator idea is an idea Negation and that the target idea is an idea Put, and a rule label placed on the rule arrow to indicate the conversion criteria of rule 4.

The rule label is "R4: A10>2" wherein:

the characters "R4" indicate rule 4, the character "A" indicates the conversion direction, and the characters "10>2" indicate that the maximum allowable idea distance between an operator and a target idea is 10 and that the maximum allowable idea distance is greater than the idea distance of 2 between operator idea Negation and target idea Put in the exemplary text equivalent.

The rule arrow has an arrowhead pointing to the target result arrow corresponding to conversion direction A.

A conversion specification of rule 4 is that the idea distances both preceding and following both deleted ideas Negation and Put are summed. The summation is represented in the audit diagram by retaining the numbers 58, 2 and 22 in the exemplary text equivalent.

FIG. 8 illustrates an output 800 of an audit diagram corresponding to an aspect of example 1 produced by outputting 317. The top horizontal row of the audit diagram includes a display of the same exemplary text equivalent as in output 400 with the modifications resulting from the use of rule 5. The audit diagram includes a conversion representation of a conversion process resulting from the use of rule 5 wherein the conversion representation includes:

an operator indicator in the form of a vertical indicator line extending from the mnemonic of an operator idea Dumpty, a vertical result arrow extending from mnemonic "INSERT" to mnemonic Egg to indicate that a resulting idea Egg is inserted to the right of prior operator idea Dumpty, a horizontal rule arrow extending from the operator indicator to the result arrow to indicate that the rule specifies inserting idea Egg following idea Dumpty, and a rule label placed on the rule arrow to indicate the conversion criteria of rule 5.

The rule label is "R5: A 0>0" wherein:

the characters "R5" indicate rule 5, the character "A" indicating the conversion direction, and the characters "0>0" indicating that an idea distance of 0 is inserted into the exemplary text equivalent following idea Dumpty.

The rule arrow has an arrowhead pointing to the insertion result arrow to indicate that the inserted idea Egg follows operator idea Dumpty.

In the exemplary embodiment discussed hereinbefore, various modifications can be made without departing from the scope of the present invention. These modifications include:

Alternate line forms: In the exemplary embodiment, the result arrows, the indicator lines, and the rule arrows are all straight in an audit diagram. In an alternate embodiment, one or more of a result arrow, an indicator line or a rule arrow is not straight.

Alternate layouts for text equivalents: In the exemplary embodiment, the ideas and the idea distances of a text equivalent are shown in a horizontal row in an audit diagram. In an alternate embodiment, the path connecting ideas and idea distances is not a straight line.

What is claimed is:

1. A system for displaying an audit diagram comprising:
    a monitor;
    a constructing logic to construct a text equivalent from an input text, wherein the text equivalent is an alternating sequence of one or more idea distances and one or more ideas;
    a converting logic to convert the text equivalent by implementing one or more conversion rules, wherein a conversion rule comprising one or more rule specifications; and
    an outputting logic to electronically display on the monitor an audit diagram comprising the text equivalent constructed from the input text, and a conversion representation comprising an operator indicator and a result arrow.

2. The system of claim 1, wherein an idea comprises one or more strings of text characters.

3. The system of claim 1, wherein an idea distance comprises a distance between idea positions.

4. The system of claim 3, wherein an idea position comprises a beginning of the input text.

5. The system of claim 1, wherein a rule specification comprises an assignment of a state to an idea.

6. The system of claim 5, wherein the state is prior, wherein prior corresponds to an idea prior to a conversion process.

7. The system of claim 5, wherein the state is resulting, wherein resulting corresponds to an idea resulting from a conversion process.

8. The system of claim 1, wherein the result arrow indicates a result of a conversion process.

9. The system of claim 1, wherein the conversion representation comprises a rule arrow indicating an operator idea and a target idea.

\* \* \* \* \*